United States Patent
Sugie et al.

(10) Patent No.: US 11,638,425 B2
(45) Date of Patent: May 2, 2023

(54) AGENT FOR INDUCING STRESS TOLERANCE IN PLANTS

(71) Applicants: Menicon Co. Ltd., Nagoya (JP); National University Corporation Shizuoka University, Shizuoka (JP)

(72) Inventors: Toshimasa Sugie, Nagoya (JP); Naoki Kato, Nagoya (JP); Masakazu Hara, Shizuoka (JP)

(73) Assignees: National University Corporation Shizuoka University, Shizuoka (JP); Menicon Co. Ltd., Nagoya (JP)

( * ) Notice: Subject to any disclaimer, the term of this patent is extended or adjusted under 35 U.S.C. 154(b) by 97 days.

(21) Appl. No.: 16/484,304

(22) PCT Filed: Feb. 9, 2018

(86) PCT No.: PCT/JP2018/004707
§ 371 (c)(1),
(2) Date: Nov. 6, 2019

(87) PCT Pub. No.: WO2018/147439
PCT Pub. Date: Aug. 16, 2018

(65) Prior Publication Data
US 2020/0060269 A1 Feb. 27, 2020

(30) Foreign Application Priority Data
Feb. 10, 2017 (JP) .............................. JP2017-023466

(51) Int. Cl.
| | | |
|---|---|---|
| A01N 35/06 | (2006.01) | |
| A01N 37/06 | (2006.01) | |
| A01N 37/42 | (2006.01) | |
| A01N 37/36 | (2006.01) | |
| A01N 37/02 | (2006.01) | |

(52) U.S. Cl.
CPC ............. *A01N 35/06* (2013.01); *A01N 37/02* (2013.01); *A01N 37/06* (2013.01); *A01N 37/36* (2013.01); *A01N 37/42* (2013.01)

(58) Field of Classification Search
None
See application file for complete search history.

(56) References Cited

U.S. PATENT DOCUMENTS

| | | | | |
|---|---|---|---|---|
| 2,349,772 | A * | 5/1944 | Horst | .................... C07C 205/45 |
| | | | | 514/681 |
| 4,929,642 | A | 5/1990 | Lindner et al. | |
| 4,970,328 | A | 11/1990 | Lindner et al. | |
| 5,834,515 | A | 11/1998 | Khambay et al. | |
| 8,658,567 | B2 | 2/2014 | Su et al. | |
| 2005/0222258 | A1 * | 10/2005 | Wang | ..................... A61K 31/22 |
| | | | | 514/546 |
| 2008/0311228 | A1 * | 12/2008 | Kim | ........................ A61P 25/00 |
| | | | | 424/725 |
| 2013/0217745 | A1 * | 8/2013 | Walter | .................... A01N 43/56 |
| | | | | 514/406 |
| 2014/0343165 | A1 | 11/2014 | Stich et al. | |
| 2014/0364316 | A1 | 12/2014 | Hara et al. | |

FOREIGN PATENT DOCUMENTS

| | | |
|---|---|---|
| CN | 104127885 | 11/2014 |
| CN | 104447265 | 3/2015 |
| CN | 106879335 A | 6/2017 |
| EP | 1595536 | 11/2005 |
| EP | 2324709 A1 | 5/2011 |
| JP | 47-25327 | 10/1972 |
| JP | 54-15828 B2 | 6/1979 |
| JP | 64-61440 A | 3/1989 |
| JP | 02-221201 A | 9/1990 |
| JP | 10-500677 A | 1/1998 |
| JP | 10-45574 A | 2/1998 |
| JP | 11-21262 A | 1/1999 |
| JP | 11-151050 A | 6/1999 |
| JP | 11-199419 A | 7/1999 |
| JP | 2007-045709 A | 2/2007 |
| JP | 2013-542959 A | 11/2013 |
| WO | 2004073699 | 9/2004 |
| WO | WO-2013/151041 A1 | 10/2013 |

OTHER PUBLICATIONS

Kawakami, N. et al., "Inhibitory effect of acetylshikonin on the activation of NADPH oxidase in polymorphonuclear leukocytes in both whole cell and cell-free systems," Biological and Pharmaceutical Bulletin, Vo. 19(10), pp. 1266-1270 (1996).*

The Agrochemicals Handbook, The Royal Society of Chemistry, Unwin Brothers Ltd., Surrey, entry pages for dichlone, A137/Oct. 1983 (1983).*

Gorth, D., "Timing and rate effects of rice fungicides," Louisiana Agriculture, 2002; retrieved from the Internet:<https://www.lsuagcenter.com/portals/communications/publications/agmag/archive/2002/winter/timing-and-rate-effects-of-rice-fungicides>.*

Ghadirnezhad, R. et al., "Temperature effect on yield and yield components of different rice cultivars in flowering stage," International Journal of Agronomy, vol. 2014, Article ID 846707, pp. 1-4 (2014).*

Jagadish, S.V.K. et al., "High temperature stress and spikelet fertility in rice (*Oryza sativa* L.)," Journal of Experimental Botany, vol. 58(7), pp. 1627-1635 (2007).*

(Continued)

*Primary Examiner* — John Pak
(74) *Attorney, Agent, or Firm* — Schwegman Lundberg & Woessner, P.A.

(57) ABSTRACT

A plant stress tolerance-inducing agent is provided that contains, as an active ingredient, a compound having a specific quinone skeleton. Alternatively, a plant stress tolerance-inducing agent is provided that contains, as an active ingredient, at least one compound selected from the group consisting of 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, a shikonin compound, and an alkannin compound.

6 Claims, No Drawings

(56) References Cited

OTHER PUBLICATIONS

International Application Serial No. PCT/JP2018/004707, International Search Report dated May 1, 2018, (w/ English Translation), 7 pgs.
Hara, Masakazu, "Substances for improving Thermotolerance of Plants and Use Thereof", *Journal of Arid Land Studies*, 25(4), (2016), 301-304.
Shinkai, Yasuhiro, et al., "1,4-Naphthoquinone, an environmental electrophile, activates the electrophilic signaling of the HSP90/HSF1 pathway in human epithelial A431 cells", (w/ English Abstract), *Forum 2013 Pharmaceutical Health Science Environmental Toxicology*, (2013), p. 252 (2 pgs.).
Westerheide, Sandy D., et al., "Celastrols as Inducers of the Heat Shock Response and Cytoprotection", *The Journal of Biological Chemistry*, 279(53), (2004), 56053-56060.
Yoshihisa, Yoko, et al., "Alkannin, HSP70 Inducer, Protects against UVB-lnduced Apoptosis in Human Keratinocytes", *PLoS One*, 7(10): e47903, (2012), 1-9.
Sanchez-Calvo, Juan M, "Synthesis, antibacterial and antifungal activities of naphthoquinone derivatives: a structure-activity relationship study", Med Chem Res, 25(6), (2015), 1274-1285.
Weissenberg, M, "Effect of Substituent and Ring Changes in Naturally Occurring Naphthoquinones on the Feeding Response of Larvae of the Mexican Bean Beetle, *Epilachna varivestis*", Journal of Chemical Ecology, vol. 23, No. 1, (1997), 3-18.

\* cited by examiner

AGENT FOR INDUCING STRESS TOLERANCE IN PLANTS

This application is a U.S. National Stage Filing under 35 U.S.C. 371 from International Application No, PCT/JP2018/004707, filed on Feb. 9, 2018, and published as WO 2018/147439 A1 on Aug. 16, 2018, which claims the benefit of priority Japanese Patent Application No. 2017-023466, filed on Feb. 10, 2017, each of which is incorporated by reference herein in its entirety.

TECHNICAL FIELD

The present invention relates to a plant stress tolerance-inducing agent containing, as an active ingredient, a compound having a quinone skeleton, a method for reducing rice quality loss, a method for growing lawn by heat mitigation, a method for suppressing the spindly growth of a seedling, a method for suppressing the poor growth of a flowering plant, a method for reducing the quality deterioration of a fruit tree, and a method for reducing the quality deterioration of a vegetable.

BACKGROUND ART

In general, plants are known to exhibit a stress defense response, for example, the expression of a stress response gene, when exposed to various environmental stresses. However, the poor growth of plants, particularly, decrease in the productivity of agricultural crops, caused by rapid environmental degradation, for example, heat stress such as global warming, has been an international issue in recent years. In Japan as well, there have arisen many cases where agricultural crops are damaged due to heat or drought during the summer season of severe heat in recent years. For example, for plants of the family Poaceae, the emergence of immature grains, such as white grains of rice, by heat ascribable to severe heat and dry wind has become a problem. In the case where seedlings receive stresses in the process of growing, spindly growth might occur, resulting in subsequent poor growth and decrease in productivity. Furthermore, poor growth, such as the emergence of malformed flowers or leaf dying or delay of flower bud differentiation, caused by heat stress has been reported as to flowering plants such as plants of the family Compositae and plants of the family Rosaceae.

Heretofore, various studies have been made on measures against such plant stresses. For example, a method for controlling a growth environment by preventing solar radiation through an agricultural material is known, such as cultivation in greenhouses. However, this method has problems such as the need of executing a wide range of large-scale construction work and the need of enormous cost. Also, a method based on the production of heat-tolerant plants by cross breeding has received attention as a radical method for enhancing the heat tolerance of plants themselves. However, this method disadvantageously requires time and labor for mating and cannot efficiently produce the plant of interest in response to rapid environmental degradation.

Accordingly, a method for inducing the stress tolerance of a plant using a stress tolerance-inducing agent is currently being searched for. The stress tolerance-inducing agent has been studied, focusing on natural components as disclosed in, for example, patent documents 1 and 2. Patent document 1 discloses a high-temperature stress tolerance-imparting agent for agriculture and horticulture containing, as an active ingredient, an extracted component from licorice. Patent document 2 discloses a drug composition for imparting environmental stress tolerance containing an enzymatic degradation product of a yeast cell wall.

PRIOR ART LITERATURE

Patent Literature

Patent Document 1: Japanese Laid-Open Patent Publication No. 11-199419
Patent Document 2: Japanese Laid-Open Patent Publication No. 2007-45709

SUMMARY OF THE INVENTION

Problem to be Solved by the Invention

However, as disclosed in patent documents 1 and 2, the problem of a stress tolerance-inducing agent containing a natural component as an active ingredient is a still insufficient effect.

An object of the present invention is to provide a plant stress tolerance-inducing agent that exerts an excellent stress tolerance-inducing effect on plants, a method for reducing rice quality loss, a method for growing lawn by heat mitigation, a method for suppressing the spindly growth of a seedling, a method for suppressing the poor growth of a flowering plant, a method for reducing the quality deterioration of a fruit tree, and a method for reducing the quality deterioration of a vegetable.

Means for Solving the Problem

The present invention is based on the finding that a compound having a specific quinone skeleton exerts an excellent stress tolerance-inducing effect on plants.

In order to attain the object and in accordance with one aspect of the present invention, a plant stress tolerance-inducing agent is characterized in that it contains, as an active ingredient, a compound having a quinone skeleton represented by the following general formula (I).

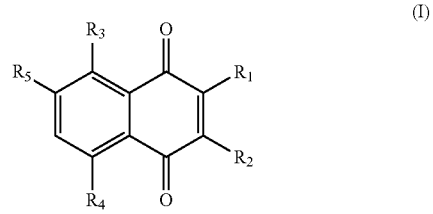

(In the formula, $R_1$ is a hydrogen atom, a hydroxyl group, an amino group, a halogen atom, an alkyl group, an alkenyl group, an alkoxy group, an aryl group, or a —$CHR_6$—$CH_2CH{=}C(CH_3)_2$ group, $R_2$ is a hydrogen atom, a hydroxyl group, an amino group, a halogen atom, an alkyl group, an alkenyl group, an alkoxy group, or an aryl group, $R_1$ and $R_2$ may be optionally bonded to each other to form a benzene ring, $R_3$ is a hydrogen atom, a hydroxyl group, or a nitro group.
$R_4$ is a hydrogen atom, a hydroxyl group, or a nitro group,
$R_5$ is a hydrogen atom, a hydroxyl group, or a nitro group, and $R_6$ is a hydrogen atom, a hydroxyl group, or an ester bond-containing group.)

In the general formula (I), $R_1$ may be a hydrogen atom, a hydroxyl group, a halogen atom, a methyl group, an alkenyl group, an alkoxy group (except for a methoxy group), or a —$CHR_6$—$CH_2CH$=$C(CH_3)_2$ group, $R_2$ may be a hydrogen atom or a halogen atom, $R_3$ may be a hydrogen atom, a hydroxyl group, or a nitro group, $R_4$ may be a hydrogen atom, a hydroxyl group, or a nitro group.

$R_5$ may be a hydrogen atom or a nitro group, $R_6$ may be a hydrogen atom or a —OCO—$R_7$ group, $R_7$ may be an alkyl group, a hydroxyalkyl group having one or more hydroxyl groups, an alkenyl group, or a —$R_8$—OCO—$R_9$ group, $R_8$ may be a hydrocarbon represented by —$C_nH_{2n}$— (n is 2 or larger), and $R_9$ may be an alkyl group, and the plant stress tolerance-inducing agent may contain, as the active ingredient, a compound of the general formula (I) other than 2-methyl-1,4-naphthoquinone.

The compound may be at least one compound selected from the group consisting of 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, a shikonin compound, and an alkannin compound.

The shikonin compound may be at least one compound selected from the group consisting of shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, and β-acetoxyisovalerylshikonin, and the alkannin compound may be at least one compound selected from the group consisting of alkannin, deoxyalkannin, acetylalkannin, isobutyrylalkannin, α-methyl-n-butylalkannin, isovalerylalkannin, β-hydroxyisovalerylalkannin, β,β-dimethylacrylalkannin, and β-acetoxyisovalerylalkannin.

The plant stress tolerance induction may be at least induction of heat shock protein expression.

The stress may be at least one stress selected from the group consisting of temperature stress, osmotic stress, pathological stress, damage stress, atmospheric stress, pH stress, light stress, and chemical stress.

The stress may be at least one stress selected from the group consisting of high-temperature stress, osmotic stress, and light stress, and the plant may be a plant expressing a heat shock protein.

The plant may be at least one plant selected from the group consisting of a plant of the order Brassicales, a plant of the order Fabales, a plant of the order Asterales, a plant of the order Rosales, a plant of the order Solanales, a plant of the order Sapindales, and a plant of the order Poales.

The plant stress tolerance-inducing agent may be used as an agent reducing rice quality loss, an agent growing lawn by heat mitigation, an agent suppressing the spindly growth of a seedling, an agent suppressing the poor growth of a flowering plant, an agent reducing the quality deterioration of a fruit tree, or an agent reducing the quality deterioration of a vegetable.

In accordance with another aspect of the present invention, a method for reducing rice quality loss, for growing lawn by heat mitigation, for suppressing the spindly growth of a seedling, for suppressing the poor growth of a flowering plant, for reducing the quality deterioration of a fruit tree, or for reducing the quality deterioration of a vegetable is characterized in that it includes using the plant stress tolerance-inducing agent.

In the method for reducing rice quality loss, the plant stress tolerance-inducing agent may be sprayed at the time including a boot stage or a heading stage.

Effect of the Invention

According to the present invention, an excellent stress tolerance-inducing effect is exerted on plants.

MODES FOR CARRYING OUT THE INVENTION

First Embodiment

Hereinafter, the first embodiment in which the present invention is materialized as a plant stress tolerance-inducing agent will be described. The active ingredient of the plant stress tolerance-inducing agent of the present embodiment contains a compound having a quinone skeleton represented by the following general formula (I).

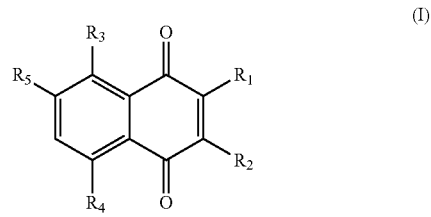

(In the formula, $R_1$ is a hydrogen atom, a hydroxyl group, an amino group, a halogen atom, an alkyl group, an alkenyl group, an alkoxy group, an aryl group, or —$CHR_6$—$CH_2CH$=$C(CH_3)_2$ group, $R_2$ is a hydrogen atom, a hydroxyl group, an amino group, a halogen atom, an alkyl group, an alkenyl group, an alkoxy group, or an aryl group, $R_1$ and $R_2$ may be optionally bonded to each other to form a benzene ring, $R_3$ is a hydrogen atom, a hydroxyl group, or a nitro group, $R_4$ is a hydrogen atom, a hydroxyl group, or a nitro group, $R_5$ is a hydrogen atom, a hydroxyl group, or a nitro group, and $R_6$ is a hydrogen atom, a hydroxyl group, or an ester bond-containing group.)

An excellent plant stress tolerance-inducing effect is exerted through the compound of the general formula (I). Examples of the compound of the general formula (I) include a naphthoquinone compound, and an anthraquinone compound in which $R_1$ and $R_2$ are bonded to each other to form a benzene ring. Specific examples of the halogen atom constituting each substituent include fluorine, chlorine, iodine, and bromine. The amino group may be a monovalent group represented by —$NH_2$ or may be a substituted amino group having, for example, an alkyl group. The carbon chain constituting the alkyl group, the alkenyl group, or the alkoxy group may be linear or may be branched. One of these active ingredients may be used alone, or two or more thereof may be used in combination.

Specific examples of the compound of the general formula (I) include 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, a shikonin compound, and an alkannin compound, which is an enantiomer of the shikonin compound.

Specific examples of the shikonin compound include shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, and β-acetoxyisovalerylshikonin. Since the shikonin compound is a natural pigment present in an ester form such as acetylshikonin in the root of *Lithospernum erythrorhizon* of the family Boraginaceae, a crude extract obtained by extraction from the plant material, or a purified product thereof may be used.

Specific examples of the alkannin compound include alkannin, deoxyalkannin, acetylalkannin, isobutyrylalkannin, α-methyl-n-butylalkannin, isovalerylalkannin, β-hydroxyisovalerylalkanninm β,β-dimethylacrylalkannin, and β-acetoxyisovalerylalkannin. Since the alkannin compound is a natural pigment present in *Borago officinalis*, a crude extract obtained by extraction from the plant material, or a purified product thereof may be used.

The compound having a quinone skeleton represented by the general formula (I) is preferably a naphthoquinone compound from the viewpoint of exerting an excellent plant stress tolerance-inducing effect.

From the viewpoint of the excellent effects of the present invention, it is more preferable that in the general formula (I), $R_1$ is a hydrogen atom, a hydroxyl group, a halogen atom, a methyl group, an alkenyl group, an alkoxy group (except for a methoxy group), or a —$CHR_6$—$CH_2CH$=$C(CH_3)_2$ group, $R_2$ is a hydrogen atom or a halogen atom, $R_3$ is a hydrogen atom, a hydroxyl group, or a nitro group, $R_4$ is a hydrogen atom, a hydroxyl group, or a nitro group, $R_5$ is a hydrogen atom or a nitro group, $R_6$ is a hydrogen atom or a —OCO—$R_7$ group, $R_7$ is an alkyl group, a hydroxyalkyl group having one or more hydroxyl groups, an alkenyl group, or a —$R_8$—OCO—$R_9$ group, $R_8$ is a hydrocarbon represented by —$C_nH_{2n}$— (n is 2 or larger), and $R_9$ is an alkyl group, and the plant stress tolerance-inducing agent contains, as the active ingredient, a compound of the general formula (I) other than 2-methyl-1,4-naphthoquinone (vitamin $K_3$).

The compound having a quinone skeleton represented by the general formula (I) is further preferably a compound of the formula having a hydroxyl group in any of $R_1$, $R_3$, and $R_4$, a compound of the formula having a halogen atom in any of $R_1$ and $R_2$, a shikonin compound, or an alkannin compound.

The plant to which the plant stress tolerance-inducing agent of the present embodiment is applied is not particularly limited and is preferably a plant expressing at least a heat shock protein. The heat shock protein (HSP) refers to a protein whose expression is induced by high-temperature stress and is known as a group of proteins called molecular chaperon. The presence of the heat shock protein is widely found over many organism species from prokaryotes to eukaryotes. Also, some heat shock proteins are known to participate in tolerance other than high-temperature tolerance, for example, tolerance to an environmental stress such as temperature stress (e.g., low-temperature stress), osmotic stress, pathological stress, damage stress, atmospheric stress, pH stress, light stress, or chemical stress. Examples of the osmotic stress include salt stress and drought stress. Examples of the pathological stress include stress caused by viral or bacterial infection. Examples of the damage stress include feeding damage, hail, frost, and wind. Examples of the atmospheric stress include oxygen or carbon dioxide concentration change stress and air pollution stress. Examples of the pH stress include pH change stress and acid or alkali stress. Examples of the light stress include strong light stress and ultraviolet stress. Examples of the chemical stress include pesticides, soil pollution, and excessive use of fertilizers. In the case where the plant stress tolerance-inducing agent of the present embodiment is applied to a plant and heat shock protein expression is induced, improvement in not only tolerance to high-temperature stress but tolerance to each of these stresses is expected. The relationship between heat shock proteins and stresses is also described in, for example, "High-level overexpression of the *Arabidopsis* HsfA2 gene confers not only increased themotolerance but also salt/osmotic stress tolerance and enhanced callus growth" (Journal of Experimental Botany. Vol. 58, No. 12, pp. 3373-3383, 2007) and "The role of class A1 heat shock factors (HSFA1s) in response to heat and other stresses in *Arabidopsis*" (Plant. Cell and Environment (2011) 34, 738-751).

Examples of the heat shock protein include all heat shock proteins present in plants. Specific examples thereof include heat shock proteins under GenBank Accession Nos. NM_111731.3, NM_105769.1, NM_128771.2, NM_121241.2, NM_128504.2, NM_127615.2, NM_101471.2, NM_125364.1, NM_119862.2. NM_118906.2, and NM_124642.2.

The plant expressing a heat shock protein may be any of angiosperms and gymnosperms. Specific examples thereof include plants of the order Solanales, plants of the order Apiales, plants of the order Caryophyllales, plants of the order Asterales, plants of the order Fabales, plants of the order Liliales, plants of the order Rosales, plants of the order Cucurbitales, plants of the order Theales, plants of the order Pinales, plants of the order Myrtales, plants of the order Lamiales, plants of the order Sapindales, plants of the order Vitales, plants of the order Poales, plants of the order Brassicales, and plants of the order Zingiberales. More specific examples thereof include: plants of the family Solanaceae such as tomato, eggplant, bell pepper, chili pepper, and potato; plants of the family Umbelliferue such as carrot, celery, and *Bupleurum scorzonerifolium*; plants of the family Chenopodiaceae such as beet and spinach; plants of the family Compositae such as chop-suey greens, lettuce, burdock, *gerbera*, and *chrysanthemum*; plants of the family Leguminosae such as soybean, pea, licorice, alfalfa, and sweet pea; plants of the family Liliaceae such as Welsh onion, onion, garlic, and tulip; plants of the family Rosaceae such as strawberry, rose, apple, peach, and pear: plants of the family Cucurbitaceae such as watermelon, melon, and cucumber; plants of the family Convolvulaceae such as sweet potato; plants of the family Theaceae such as tea and camellia; plants of the family Myrtaceae such as *eucalyptus*;

plants of the family Oleaceae such as olive; plants of the family Rutaceae such as *Citrus unshiu* and lemon; plants of the family Vilaceae such as grape; plants of the family Lamiaceae such as Japanese basil, basil, mint, rosemary, and sage; plants of the family Poaceae such as rice, wheat, barley, oat, common millet, foxtail millet, Japanese millet, rye, bamboo, maize, lawn, ryegrass, sugarcane, and Job's tears; plants of the family Brassicaceae such as *Arabidopsis thaliana*, daikon radish, Japanese mustard spinach, Qing geng cai, broccoli, and cabbage; plants of the family Musaceae such as banana; plants of the family Anacardiaceae such as mango; plants of the family Caricaceae; evergreen trees such as the family Pinaceae and the family Cupressaceae; evergreen perennial plants such as the family Aizoaceae and the family Asparagaceae; bryophytes; and other tropical plants.

The method of using the plant stress tolerance-inducing agent of the present embodiment is performed by, for example, spraying to the target plant or dipping. The dosage form of the plant stress tolerance-inducing agent may be any of solid formulations and liquid formulations. The solid formulations are advantageous in their excellent preservation stability, and the liquid formulations are advantageous in their excellent fast-acting properties and spraying properties. Examples of the solid formulations include dosage forms such as powders, particles, and granules. In the case of utilizing a solid formulation, the solid formulation may be directly sprayed or may be dissolved in a solvent such as water, diluted to a predetermined concentration, and then applied by spraying, atomization, injection, or irrigation. Examples of the liquid formulations include solutions as well as dosage forms such as suspensions and gels. In the case where the plant stress tolerance-inducing agent is prepared as a liquid formulation, the liquid formulation may be directly sprayed or may be diluted to a predetermined concentration and then applied by spraying, atomization, injection, or irrigation. The application of the plant stress tolerance-inducing agent may be performed to at least one of the plant organs, for example, a flower, a leaf, a fruit, a stem, a trunk, and a root, of the plant to be protected, and may be performed to the base of the plant or soil.

In the case of utilizing a liquid formulation, the concentration of the quinone compound as an active ingredient in the solution can be appropriately set according to, for example, the type of the active ingredient and the variety of the plant and is preferably 0.001 μM to 1000 mM, more preferably 0.01 μM to 100 mM, and further preferably 0.1 μM to 10 mM. Particularly, in the case where the active ingredient is a shikonin compound or an alkannin compound, the concentration is preferably 0.01 μM to 1000 mM, more preferably 0.1 μM to 100 mM, and further preferably 1 μM to 10 mM. By controlling the concentration within this range, the stress tolerance of the plant can be improved while burdens on the plant are alleviated. For application to the plant, it is preferred to almost uniformly spray the liquid formulation to the above-ground part. In this respect, the volume of the liquid formulation sprayed can be appropriately set according to, for example, the type of the active ingredient and the variety of the plant.

The stress tolerance of a plant can be improved by applying the plant stress tolerance-inducing agent of the present embodiment to the plant. Examples of the type of the stress include, but are not particularly limited to, temperature (high-temperature or low-temperature) stress, osmotic stress, pathological stress, damage stress, atmospheric stress, pH stress, light stress, and chemical stress as mentioned above.

In the case where the induction of the stress tolerance of the plant is the induction of heat stress tolerance, this refers to the acquisition of tolerance to heat stress in a temperature environment higher than the usual growth temperature of the plant. The temperature environment higher than the usual growth temperature differs depending on, for example, the type and habitat of the plant and refers to, for example, a high temperature exceeding 25 to 30° C., specifically a relatively high temperature range of 25 to 55° C. or 30 to 45° C. The duration of the heat stress includes a short time such as several hours as well as a long period such as several days, several months, or several years. The stress tolerance can be evaluated on the basis of, for example, the growing condition of the plant. The plant (including a portion of the plant) to which the plant stress tolerance-inducing agent has been applied can be evaluated as an individual that has acquired stress tolerance, provided that its growth or growing condition is favorable as compared with a control plant. Examples of the evaluation item include the size, weight, and color of the plant (including a portion of the plant). These evaluation items may be comprehensively determined. Furthermore, increase in the expression level of a heat shock protein gene or increase in the amount of a heat shock protein in the plant may be used as an index.

In the case of using HSP17.6, which is a heat shock protein in *Arabidopsis thaliana* (the family Brassicaceae), as an index, the amount of HSP17.6 expressed by the action of a 50 μM geldanamycin solution as a positive control is defined as 1 (HSP induction unit). When any of the active ingredients mentioned above is administered to the same plant as above, the heat shock protein is preferably expressed in an amount of 0.01 or more, more preferably in an amount of 0.1 or more, and further preferably in an amount of 0.25 or more. In this case, the amount of the active ingredient administered is preferably 0.01 μM to 100 mM as mentioned above, more preferably 0.01 μM to 10 mM, and further preferably 0.1 μM to 10 mM.

According to the plant stress tolerance-inducing agent of the present embodiment, effects as given below can be obtained.

(1) The plant stress tolerance-inducing agent of the present embodiment contains, as an active ingredient, a quinone compound represented by the general formula (I). Thus, excellent stress tolerance can be induced in the target plant by spraying to the plant. For example, decrease in the growth of plants or the productivity of agricultural crops can be suppressed even against environmental change such as drought or severe heat caused by rapid environmental degradation in recent years.

(2) The quinone compound represented by the general formula (I) as an active ingredient may be chemically synthesized for use, or a commercially available product may be used. Alternatively, a crude extract obtained by extraction from a natural material, or a purified component may be used. Thus, the plant stress tolerance-inducing agent can be inexpensively obtained. Stress environment adaptability can be enhanced at low cost without the need of expensive agricultural materials.

Second Embodiment

Hereinafter, the second embodiment in which the present invention is materialized as a method for reducing rice quality loss will be described in detail. The description below is centered on the difference from the first embodiment.

The method of the present embodiment for reducing rice quality loss employs the compound having a quinone skeleton represented by the general formula (I), which is an active ingredient of the first embodiment. One of these compounds may be used alone, or two or more thereof may be used in combination. Among the compounds of the general formula (I), at least one compound having a naphthoquinone skeleton, selected from 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, β-acetoxyisovalerylshikonin, alkannin, deoxyalkannin, acetylalkannin, isobutyrylalkannin, α-methyl-n-butylalkannin, isovalerylalkannin, f-hydroxyisovalerylalkannin, β,β-dimethylacrylalkannin, and β-acetoxyisovalerylalkannin is preferred. The quality loss of rice is reduced by spraying this compound to a plant of the family Poaceae. The compound particularly exerts an effect of preventing the formation of immature grains that appear at an increased rate due to high-temperature injury. The immature grains that appear due to high-temperature injury include chalky grains, milky white grains, white-core grains, white-base grains, white-back grains, white-belly grains, dead grains, and cracked grains. The type of the rice is not particularly limited, and the rice to be evaluated for its quality may be any of polished rice and brown rice. The spraying method to the plant of the family Poaceae can adopt the same method as in the first embodiment. The active ingredient to be sprayed to the plant of the family Poaceae is not only sprayed to the plant or soil, but may be indirectly administered by spraying to water in a paddy field or water in an irrigation canal. The spraying timing is not particularly limited and is preferably within the time period including a panicle formation stage, a boot stage, a heading stage, or a grain-filling stage from the viewpoint of exerting the effect of preventing immature grain formation, more preferably within the time period including a boot stage or a heading stage from the viewpoint of efficiently exerting this effect.

The method for reducing rice quality loss according to the present embodiment has the following advantage in addition to the effects of the first embodiment.

(3) The method according to the present embodiment employs the quinone compound represented by the general formula (I) mentioned above. The quality loss of rice that occurs, particularly, due to high-temperature injury is reduced by spraying this compound to a plant of the family Poaceae. For example, the problem of cereal crops such as rice in the summer season of severe heat is the emergence of immature grains of rice, such as chalky grains of rice, due to an environmental stress such as heat ascribable to severe heat or dry wind. Appearance deterioration, quality loss, or decrease in sales price can be suppressed by suppressing the emergence of immature grains.

Third Embodiment

Hereinafter, the third embodiment in which the present invention is materialized as a method for growing lawn by heat mitigation will be described in detail. The description below is centered on the difference from the first embodiment.

The method of the present embodiment for growing lawn by heat mitigation employs the compound having a quinone skeleton represented by the general formula (I), which is an active ingredient of the first embodiment. One of these compounds may be used alone, or two or more thereof may be used in combination. Among the compounds of the general formula (I), at least one compound having a naphthoquinone skeleton, selected from 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, β-acetoxyisovalerylshikonin, alkannin, deoxyalkannin, acetylalkannin, isobutyrylalkannin, α-methyl-n-butylalkannin, isovalerylalkannin, β-hydroxyisovalerylalkannin, β,β-dimethylacrylalkannin, and β-acetoxyisovalerylalkannin is preferred. The spraying method to the lawn can adopt the same method as in the first embodiment. Examples of the type of the lawn include, but are not particularly limited to, plants of the family Poaceae known in the art which are applied to lawn, for example, the genus *Zoysia*.

The method for growing lawn by heat mitigation according to the present embodiment has the following advantage in addition to the effects of the first embodiment.

(4) The method according to the present embodiment employs the quinone compound represented by the general formula (I) mentioned above. An excellent growing effect based on heat mitigation is exerted by spraying this compound to lawn. More specifically, lawn grows well even in a high-temperature environment, and root spread can be improved.

Fourth Embodiment

Hereinafter, the fourth embodiment in which the present invention is materialized as a method for suppressing the spindly growth of a seedling will be described in detail. The description below is centered on the difference from the first embodiment.

The method of the present embodiment for suppressing the spindly growth of a seedling employs the compound having a quinone skeleton represented by the general formula (I), which is an active ingredient of the first embodiment. One of these compounds may be used alone, or two or more thereof may be used in combination. Among the compounds of the general formula (I), at least one compound having a naphthoquinone skeleton, selected from 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, β-acetoxyisovalerylshikonin, alkannin, deoxyalkannin, acetylalkannin, isobutyrylalkannin, α-methyl-n-butylalkannin, isovalerylalkannin, β-hydroxyisovalerylalkannin, β,β-dimethylacrylalkannin, and β-acetoxyisovalerylalkannin is preferred. The spindly growth of a seedling leaf, stem (e.g., hypocotyl), or root that occurs due to, for example, various stresses is suppressed by spraying this compound to the seed, the sprout, or the seedling. The spraying method to the seedling can adopt the same method as in the first embodiment. The type of the seedling is not particularly limited, and this method can be applied to the plants listed in the first embodiment. Among these plants, application to plants of the order Fabales and plants of the order Poales is preferred whose productivity is drastically decreased due to spindly growth.

The method for suppressing the spindly growth of a seedling according to the present embodiment has the following advantage in addition to the effects of the first embodiment.

(5) The method according to the present embodiment employs the quinone compound represented by the general formula (I) mentioned above. An excellent effect of suppressing the spindly growth of a seedling is exerted by spraying this compound to the seed, the sprout, or the seedling. For example, the spindly growth of a seedling is suppressed even in a stress environment such as high temperature, and decrease in productivity can be suppressed. The spindly growth of seedlings may cause decrease in harvest, decrease in resistance to diseases or insect pests. The quinone compound represented by the general formula (I) exerts the spindly growth-suppressing effect and is thereby expected to, for example, increase yields and improve the quality of the plant.

Fifth Embodiment

Hereinafter, the fifth embodiment in which the present invention is materialized as a method for suppressing the poor growth of a flowering plant will be described in detail. The description below is centered on the difference from the first embodiment.

The method of the present embodiment for suppressing the poor growth of a flowering plant employs the compound having a quinone skeleton represented by the general formula (I), which is an active ingredient of the first embodiment. One of these compounds may be used alone, or two or more thereof may be used in combination. Among the compounds of the general formula (I), at least one compound having a naphthoquinone skeleton, selected from 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, β-acetoxyisovalerylshikonin, alkannin, deoxyalkannin, acetylalkannin, isobutyrylalkannin, α-methyl-n-butylalkannin, isovalerylalkannin, β-hydroxyisovalerylalkannin, β,β-dimethylacrylalkannin, and β-acetoxyisovalerylalkannin is preferred. The spraying method to the flowering plant can adopt the same method as in the first embodiment. Examples of the type of the flowering plant include, but are not particularly limited to, plants of the family Compositae and plants of the family Rosaceae.

The method for suppressing the poor growth of a flowering plant according to the present embodiment has the following advantage in addition to the effects of the first embodiment.

(6) The method according to the present embodiment employs the quinone compound represented by the general formula (I) mentioned above. A poor growth-suppressing effect is exerted by spraying this compound to a flowering plant. More specifically, flower setting without securing a sufficient plant length, due to, for example, high temperature can be avoided. The avoidance of decrease in transaction price of the flowering plant can be expected, provided that the plant length can be secured.

Sixth Embodiment

Hereinafter, the sixth embodiment in which the present invention is materialized as a method for reducing the quality deterioration of a fruit tree will be described in detail. The description below is centered on the difference from the first embodiment.

The method of the present embodiment for reducing the quality deterioration of a fruit tree employs the compound having a quinone skeleton represented by the general formula (I), which is an active ingredient of the first embodiment. One of these compounds may be used alone, or two or more thereof may be used in combination. Among the compounds of the general formula (I), at least one compound having a naphthoquinone skeleton, selected from 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, β-acetoxyisovalerylshikonin, alkannin, deoxyalkannin, acetylalkannin, isobutyrylalkannin, α-methyl-n-butylalkannin, isovalerylalkannin, β-hydroxyisovalerylalkannin, β,β-dimethylacrylalkannin, and β-acetoxyisovalerylalkannin is preferred. The spraying method to the fruit (tree) can adopt the same method as in the first embodiment. Examples of the type of the fruit include, but are not particularly limited to, plants of the family Solanaceae, plants of the family Rosaceae, plants of the family Cucurbitaceae, plants of the family Rutaceae, plants of the family Vitaceae, plants of the family Musaceae, plants of the family Anacardiaceae, and plants of the family Caricaceae.

The method for reducing the quality deterioration of a fruit tree according to the present embodiment has the following advantage in addition to the effects of the first embodiment.

(7) The method according to the present embodiment employs the quinone compound represented by the general formula (I) mentioned above. A quality deterioration-reducing effect is exerted by spraying this compound to a fruit or a fruit tree. More specifically, fruit discoloration, generation of cork, and quality loss can be reduced.

Seventh Embodiment

Hereinafter, the seventh embodiment in which the present invention is materialized as a method for reducing the quality deterioration of a vegetable will be described in detail. The description below is centered on the difference from the first embodiment.

The method of the present embodiment for reducing the quality deterioration of a vegetable employs the compound having a quinone skeleton represented by the general formula (I), which is an active ingredient of the first embodiment. One of these compounds may be used alone, or two or more thereof may be used in combination. Among the compounds of the general formula (I), at least one compound having a naphthoquinone skeleton, selected from 1,4-naphthoquinone, 5-hydroxy-1,4-naphthoquinone, 5,8-dihydroxy-1,4-naphthoquinone, 2-hydroxy-1,4-naphthoquinone, 5-hydroxy-2-methyl-1,4-naphthoquinone, 2,3-dichloro-1,4-naphthoquinone, 2,3-dichloro-5,8-dihydroxy-1,4-naphthoquinone, 2,3-dichloro-5-nitro-1,4-naphthoquinone, 2,3-dichloro-6-nitro-1,4-naphthoquinone, 2-methoxy-1,4-naphthoquinone, 2-amino-3-chloro-1,4-naphthoquinone, shikonin, deoxyshikonin, acetylshikonin, isobutyrylshikonin, α-methyl-n-butylshikonin, isovalerylshikonin, β-hydroxyisovalerylshikonin, β,β-dimethylacrylshikonin, β-acetoxyisovalerylshikonin, alkannin, deoxyalkannin, acetylalkannin, isobutyrylalkannin, α-methyl-n-butylalkannin, isovalerylalkannin, β-hydroxyisovalerylalkannin, β,β-dimethylacrylalkannin, and β-acetoxyisovalerylalkannin is preferred. The spraying method to the vegetable can adopt the same method as in the first embodiment. Examples of the type of the vegetable include, but are not particularly limited to, plants of the family Solanaceae, plants of the family Umbelliferae, plants of the family Chenopodiaceae, plants of the family Compositae, plants of the family Leguminosae, plants of the family Liliaceae, plants of the family Rosaceae, plants of the family Cucurbitaceae, plants of the family Lamiaceae, plants of the family Poaceae, and plants of the family Brassicaceae.

The method for reducing the quality deterioration of a vegetable according to the present embodiment has the following advantage in addition to the effects of the first embodiment.

(8) The method according to the present embodiment employs the quinone compound represented by the general formula (I) mentioned above. A quality deterioration-reducing effect is exerted by spraying this compound to a vegetable. More specifically, vegetable discoloration, poor growth, and quality loss can be reduced.

Each of the embodiments described above may be modified as described below.

In each of the embodiments described above, the active ingredient may be used in combination with an additive known in the art and a solvent in order to improve, for example, solubility, stability, spraying properties, or various indications. Examples of the additive known in the art include surfactants, water-soluble polymers, lubricants, antioxidants, antiseptics, binders, expanders, and pesticide active ingredients.

In each of the embodiments described above, the active ingredient may be used in combination with a conventional plant growth regulator, plant environmental stress tolerance-imparting agent, insecticide, anti-plant virus agent, miticide, or fertilizer.

The plant stress tolerance-inducing agent of the embodiment described above may be formulated as an agent reducing rice quality loss, an agent growing lawn by heat mitigation, an agent suppressing the spindly growth of a seedling, an agent suppressing the poor growth of a flowering plant, an agent reducing the quality deterioration of a fruit tree, or an agent reducing the quality deterioration of a vegetable.

EXAMPLES

Next, the embodiments will be further described with reference to examples and comparative examples. However, the present invention is not limited by the configuration described in the Examples section.

Test Example 1: HSP Expression Test Using Quinone Compound (No. 1)

A HSP-expressing effect was tested using *Arabidopsis thaliana* as a plant and naphthoquinone compounds as quinone compounds.

First, a construct linked to β-glucuronidase (GUS) gene was introduced to 1 kb upstream of HSP17.6C-C1 of *Arabidopsis thaliana* (the family Brassicaceae) to prepare a mutant. Each naphthoquinone compound (shown in Table 1) dissolved in DMSO was diluted to 1 μM, 10 μM, 100 μM, or 1000 μM (final concentration) with deionized water to prepare a test solution of each example (final concentration of DMSO: 1.0% by volume). A 50 μM geldanamycin solution was similarly prepared as a positive control.

Next, two individuals of 7-day-old *Arabidopsis thaliana* mutants grown in a ⅕ MS medium were soaked in 300 μL of the test solution of each example or the positive control at 22° C. for 6 hours. The *Arabidopsis thaliana* was washed with deionized water, then soaked in 200 μL of a 4-methylumbelliferyl-β-D-glucuronide hydrate solution containing a surfactant, and incubated at 22° C. for 16 hours in the dark. The fluorescence intensity of the supernatant was measured, and the amount of 4-methylumbelliferone (4-MU) production per plant was calculated. The calculated value of 4-MU was divided by the value of 4-MU of the positive control to calculate a ratio vs. positive control. A higher numerical value means that HSP was expressed at a larger level. The results are shown in Table 1 below.

TABLE 1

| | Active ingredient | Concentration (μM) | Ratio of 4-MU amount vs. positive control |
|---|---|---|---|
| Example 1 | 1,4-Naphthoquinone | 1 | 0.13 |
| | | 10 | 0.76 |
| | | 100 | 0.27 |
| | | 1000 | 0.03 |
| Example 2 | 2-Hydroxy-1,4-naphthoquinone | 1 | 0.14 |
| | | 10 | 0.15 |
| | | 100 | 0.47 |
| | | 1000 | 0.04 |
| Example 3 | 5-Hydroxy-1,4-naphthoquinone | 1 | 0.17 |
| | | 10 | 0.14 |
| | | 100 | 0.59 |
| | | 1000 | 0.46 |
| Example 4 | 5-Hydroxy-2-methyl-1,4-naphthoquinone | 1 | 0.13 |
| | | 10 | 1.0 |
| | | 100 | 0.18 |
| | | 1000 | 0.06 |
| Example 5 | 5,8-Dihydroxy-1,4-naphthoquinone | 1 | 0.48 |
| | | 10 | 2.49 |
| | | 100 | 1.96 |
| | | 1000 | 0.78 |
| Example 6 | 2,3-Dichloro-1,4-naphthoquinone | 1 | 0.47 |
| | | 10 | 5.12 |
| | | 100 | 1.86 |
| | | 1000 | 1.16 |

TABLE 1-continued

|  | Active ingredient | Concentration (μM) | Ratio of 4-MU amount vs. positive control |
|---|---|---|---|
| Example 7 | 2,3-Dichloro-5,8-dihydroxy-1,4-naphthoquinone | 1 | 0.80 |
|  |  | 10 | 5.91 |
|  |  | 100 | 1.72 |
|  |  | 1000 | 0.95 |
| Example 8 | 2,3-Dichloro-5-nitro-1,4-naphthoquinone | 1 | 0.15 |
|  |  | 10 | 1.00 |
|  |  | 100 | 0.38 |
|  |  | 1000 | 0.46 |
| Example 9 | 2,3-Dichloro-6-nitro-1,4-naphthoquinone | 1 | 0.17 |
|  |  | 10 | 0.91 |
|  |  | 100 | 0.66 |
|  |  | 1000 | 0.48 |
| Example 10 | 2-Methyl-1,4-naphthoquinone | 1 | 0.04 |
|  |  | 10 | 0.05 |
|  |  | 100 | 0.09 |
|  |  | 1000 | 0.08 |
| Example 11 | 2-Methoxy-1,4-naphthoquinone | 1 | 0.06 |
|  |  | 10 | 0.04 |
|  |  | 100 | 0.21 |
|  |  | 1000 | 0.11 |
| Example 12 | 2-Amino-3-chloro-1,4-naphthoquinone | 1 | 0.06 |
|  |  | 10 | 0.15 |
|  |  | 100 | 0.19 |
|  |  | 1000 | 0.14 |

As shown in Table 1, the naphthoquinone compound of each example was confirmed to significantly induce the expression of the HSP gene. Since HSPs are widely found over many organisms from prokaryotes to eukaryotes, the exertion of similar working effects is also expected for other plants having HSP.

Test Example 2: HSP Expression Test Using Quinone Compound (No. 2)

A HSP-expressing effect was tested using *Arabidopsis thaliana* as a plant and shikonin compounds and alkannin compounds as quinone compounds.

Each shikonin compound or alkannin compound (shown in Table 2) dissolved in DMSO was diluted to 1 μM, 10 μM, 100 μM, or 1000 μM (final concentration) with deionized water to prepare a test solution of each example (final concentration of DMSO: 1.0% by volume). A 50 μM geldanamycin solution was similarly prepared as a positive control. The other test procedures were performed in the same way as in Test Example 1. The calculated value of 4-MU was divided by the value of 4-MU of the positive control to calculate a ratio vs. positive control. The results are shown in Table 2 below.

TABLE 2

|  | Active ingredient | Concentration (μM) | Ratio of 4-MU amount vs. positive control |
|---|---|---|---|
| Example 13 | Shikonin | 1 | 0.04 |
|  |  | 10 | 0.92 |
|  |  | 100 | 1.52 |
|  |  | 1000 | 0.85 |
| Example 14 | Acetylshikonin | 1 | 0.05 |
|  |  | 10 | 1.03 |
|  |  | 100 | 1.00 |
|  |  | 1000 | 0.81 |
| Example 15 | Isobutyrylshikonin | 1 | 0.03 |
|  |  | 10 | 1.79 |
|  |  | 100 | 1.19 |
|  |  | 1000 | 1.23 |
| Example 16 | Isovalerylshikonin | 1 | 0.04 |
|  |  | 10 | 0.93 |
|  |  | 100 | 0.85 |
|  |  | 1000 | 0.76 |
| Example 17 | β-Hydroxyisovalerylshikonin | 1 | 0.10 |
|  |  | 10 | 0.71 |
|  |  | 100 | 0.80 |
|  |  | 1000 | 0.25 |
| Example 18 | α-Methyl-n-butylshikonin | 1 | 0.02 |
|  |  | 10 | 1.00 |
|  |  | 100 | 1.40 |
|  |  | 1000 | 2.76 |
| Example 19 | β,β-Dimethylacrylshikonin | 1 | 0.02 |
|  |  | 10 | 0.95 |
|  |  | 100 | 1.35 |
|  |  | 1000 | 2.28 |
| Example 20 | Alkannin | 1 | 0.04 |
|  |  | 10 | 0.11 |
|  |  | 100 | 0.62 |
|  |  | 1000 | 1.13 |

As shown in Table 2, the shikonin compound or the alkannin compound of each example was confirmed to produce the expression level of HSP equivalent to the positive control. Shikonin compounds and alkannin compounds, when used as the quinone compound, were also shown to have a HSP expression effect.

Test Example 3: Heat Tolerance Induction Test Using Quinone Compound (No. 1)

A heat tolerance induction test based on chlorophyll concentration was conducted using *Arabidopsis thaliana* as a plant and naphthoquinone compounds as quinone compounds.

A ⅕ MS medium was prepared in a 6-well plate, and filter paper was placed thereon. 12 individuals of wild-type *Arabidopsis thaliana* were seeded per well and grown at 22° C. for 7 days in a plant incubator under 16-hour light and 8-hour dark conditions. Next, the naphthoquinone compound of each example (shown in Table 3) dissolved in DMSO was added to a ⅕ MS medium, and each medium (final concentration: 50 μM) was prepared in a 6-well plate (final concentration of DMSO: 1.0% by volume). A medium containing 1.0% by volume of DMSO was used as a control.

The *Arabidopsis thaliana* grown for 7 days in the 6-well plate was transplanted, together with the filter paper, to the medium containing the compound and cultured for 1 day in a plant incubator. The plate was placed in a plastic bag and heat-treated at 44° C. for 1 hour in a water bath. After the heat treatment, culture was performed for 3 days in a plant incubator. The leaves of 4 *Arabidopsis thaliana* individuals were cut out, and chlorophyll was extracted with 300 μL of ethanol. The absorbance of each extract was measured at 649 nm and 665 nm, and the chlorophyll concentration (mg/L) was calculated. A higher chlorophyll concentration means that heat tolerance is better. The results are shown in Table 3 below.

TABLE 3

| Active ingredient | | Chlorophyll concentration (mg/L) |
| --- | --- | --- |
| Control | — | 3.23 |
| Example 21 | 5,8-Dihydroxy-1,4-naphthoquinone | 6.66 |
| Example 22 | 2,3-Dichloro-1,4-naphthoquinone | 6.21 |
| Example 23 | 2,3-Dichloro-5,8-dihydroxy-1,4-naphthoquinone | 6.12 |

As shown in Table 3, the chlorophyll concentration was largely increased in each example using the naphthoquinone compound, as compared with the control. The test method based on chlorophyll concentration also demonstrated the excellent heat tolerance-inducing effect of the naphthoquinone compound.

Test Example 4: Heat Tolerance Induction Test Using Quinone Compound (No. 2)

A heat tolerance induction test based on chlorophyll concentration was conducted using *Arabidopsis thaliana* as a plant and shikonin compounds as quinone compounds.

The shikonin compound of each example (shown in Table 4) dissolved in DMSO was added to a ⅕ MS medium, and each medium (final concentration: 50 μM) was prepared in a 6-well plate (final concentration of DMSO: 1.0% by volume). A medium containing 1% by volume of DMSO was used as a control. The other test procedures were performed in the same way as in Test Example 3. The obtained results about chlorophyll concentration are shown in Table 4 below.

TABLE 4

| Active ingredient | | Chlorophyll concentration (mg/L) |
| --- | --- | --- |
| Control | — | 3.76 |
| Example 24 | Shikonin | 6.28 |
| Example 25 | Acetylshikonin | 5.73 |
| Example 26 | Isobutyrylshikonin | 6.29 |
| Example 27 | β-Hydroxyisovalerylshikonin | 5.57 |

As shown in Table 4, the chlorophyll concentration was largely increased in each example using the shikonin compound, as compared with the control. Shikonin compounds, when used as the quinone compound, were also confirmed to have a heat tolerance-inducing effect based on chlorophyll concentration.

Test Example 5: Heat Tolerance Induction Test Using Naphthoquinone Compound (No. 3)

A heat tolerance induction test based on chlorophyll concentration was conducted using *Arabidopsis thaliana* as a plant and a *Lithospermi radix* extract containing shikonin compounds as a naphthoquinone compound.

The *Lithospermi radix* extract used was Shikonix Liquid (BG) (trade name, manufactured by Ichimaru Pharcos Co., Ltd.) containing a *Lithospermum erythrorhizon* root extract. The Shikonix Liquid contained, as major components, shikonin compounds such as acetylshikonin, β-hydroxyisovalerylshikonin, and isobutyrylshikonin. The Shikonix Liquid also contained, as additional minor components, α-methyl-n-butylshikonin, β,β-dimethylacrylshikonin, isovalerylshikonin, and shikonin.

The Shikonix Liquid (BG) was added at a dilution ratio of 150-fold to a ⅕ MS medium. The same amount of water was added as a control. ThermoZyme (manufactured by Fujimikogyo Co., Ltd.) was added at a dilution ratio of 150-fold as a positive control (Reference Example). The other test procedures were performed in the same way as in Test Example 3. The obtained results about chlorophyll concentration are shown in Table 5 below.

TABLE 5

| | Active ingredient | Chlorophyll concentration (mg/L) |
| --- | --- | --- |
| Control | — | 5.58 |
| Example 28 | Shikonix Liquid (BG) | 7.15 |
| Reference Example 1 | ThermoZyme | 6.63 |

As shown in Table 5, the chlorophyll concentration was largely increased in the example using the naturally derived *Lithospermi radix* extract as the quinone compound, as compared with the control. The test method based on chlorophyll concentration also demonstrated the excellent heat tolerance-inducing effect of the *Lithospermi radix* extract. Also, the chlorophyll concentration was increased as compared with ThermoZyme (positive control).

Test Example 6: Spindly Growth Suppression Test of Seedling Using Naphthoquinone Compound A spindly growth suppression test was conducted using sprouted alfalfa as a seedling and naphthoquinone compounds as quinone compounds. First, just-sprouted alfalfa (*Medicago sativa* of the family Leguminosae) was transplanted to a plastic cup containing vermiculite. Each naphthoquinone compound (shown in Table 5) dissolved in DMSO was diluted to 100 μM or 1000 μM (final concentration) with deionized water to prepare a test solution of each example (final concentration of DMSO: 1.0% by volume). An aqueous solution containing 1.0% by volume of DMSO was used as a test solution of a control. 50 μL of the test solution was sprayed per alfalfa individual. Then, cultivation was performed for 10 days in an incubator of 25° C., followed by hypocotyl length measurement. The results are shown in Table 6 below.

TABLE 6

| | Active ingredient | Concentration (μM) | Hypocotyl length (mm) |
| --- | --- | --- | --- |
| Control | — | — | 20.5 |
| Example 29 | 5,8-Dihydroxy-1,4-naphthoquinone | 100 | 14.6 |
| | | 1000 | 15.2 |
| Example 30 | 2,3-Dichloro-5,8-dihydroxy-1,4-naphthoquinone | 100 | 18.1 |
| | | 1000 | 14.6 |

As shown in Table 6, an effect of suppressing the hypocotyl length was shown in each example using the naphthoquinone compound, as compared with the control. Increase in yield is expected by the exertion of the spindly growth-suppressing effect of the naphthoquinone compound.

Test Example 7: HSP Expression Test Using Naphthoquinone Compound (No. 3)

A HSP-expressing effect was tested using *Arabidopsis thaliana* as a plant and a *Lithospermi radix* extract containing shikonin compounds as a naphthoquinone compound.

The *Lithospermi radix* extract used was Shikonix Liquid (BG) (trade name, manufactured by Ichimaru Pharcos Co., Ltd.) containing a *Lithospermum erythrorhizon* root extract. This Shikonix Liquid (BG) was diluted to each diluted concentration shown in Table 7 using water to prepare a test solution of each example. A 50 μM geldanamycin solution was similarly prepared as a positive control. The other test procedures were performed in the same way as in Test Example 1. The calculated value of 4-MU was divided by the value of 4-MU of the positive control to calculate a ratio vs. positive control. The results are shown in Table 7 below.

TABLE 7

| | Active ingredient Shikonix Liquid (BG) | Ratio of 4-MU amount vs. positive control |
|---|---|---|
| Example 31 | 50-fold dilution | 0.92 |
| Example 32 | 100-fold dilution | 1.01 |
| Example 33 | 200-fold dilution | 1.70 |
| Example 34 | 500-fold dilution | 3.23 |
| Example 35 | 1000-fold dilution | 3.56 |
| Example 36 | 2000-fold dilution | 1.04 |
| Example 37 | 5000-fold dilution | 0.47 |

As shown in Table 7, the *Lithospermi radix* extract was confirmed to exhibit a tendency to increase the expression level of HSP in a concentration-dependent manner. The naturally derived *Lithospermi radix* extract, when used as the quinone compound, was also shown to have a HSP-inducing effect.

Test Example 8: Reduction Test on Rice Quality Loss Using Naphthoquinone Compound A rice quality loss-reducing effect was tested using rice as a plant and a *Lithospermi radix* extract containing shikonin compounds as a naphthoquinone compound. The *Lithospermi radix* extract used was Shikonix Liquid (BG) (manufactured by Ichimaru Pharcos Co., Ltd.).

First, rice seedlings (variety: Koshihikari) was transplanted to 3 sites (3 individuals per site) of a Wagner pot of 1/5000a. A chemical fertilizer (N:P:K=12:16:14) was used at N: 4 kg/10a as a base fertilizer. The test was conducted in duplicate. The test of a control was conducted in quadruplicate.

Each aqueous solution of the Shikonix Liquid (BG) diluted 600-fold or 1800-fold with water was used as a test solution of each example. Water was used as a control. The test solution was sprayed on rice in a volume of 7 mL/plant to leaf surface at the boot stage. ThermoZyme (manufactured by Fujimikogyo Co., Ltd.) was diluted 1000-fold as a positive control (Reference Example) and sprayed in a volume of 35 mL/plant to leaf surface. The dilution ratio of ThermoZyme and the volume of ThermoZyme sprayed were set on the basis of the product design. After the spraying, the Wagner pots were transferred to an artificial weather chamber with the temperature set to 28.5° C. and cultivation was continued. After harvesting, thresh, seed selection with a salt solution, and hulling were performed. Then, chalky grains (total of milky white grains, white-base grains, white-back and white-belly grains) were visually identified, and the ratio was calculated. Also, cracked rice at the time of hulling was counted, and the ratio was calculated. The results are shown in Table 8 below.

TABLE 8

| | Active ingredient Shikonix Liquid (BG) | Chalky grain ratio (%) | Cracked rice ratio (%) |
|---|---|---|---|
| Control | — | 55.9 | 22.5 |
| Example 38 | 600-fold dilution | 41.2 | 15.3 |
| Example 39 | 1800-fold dilution | 41.7 | 15.6 |
| Reference Example 2 | (ThermoZyme) | 55.6 | 14.9 |

As shown in Table 8, an excellent effect of decreasing the ratios of chalky grains and cracked rice was confirmed in each example using the *Lithospermi radix* extract, as compared with the control. The *Lithospermi radix* extract was shown to have the effect of suppressing the quality loss of rice.

Test Example 9: Heat Mitigation Test of Lawn Using Naphthoquinone Compound

A heat-mitigating effect was tested using lawn as a plant and a *Lithospermi radix* extract containing shikonin compounds as a naphthoquinone compound. The *Lithospermi radix* extract used was Shikonix Liquid (BG) (manufactured by Ichimaru Pharcos Co., Ltd.). An aqueous solution of the Shikonix Liquid (BG) diluted 200-fold, 1000-fold, or 5000-fold with water was used as a test solution of each example. ThermoZyme (manufactured by Fujimikogyo Co., Ltd.) was diluted 1000-fold as a positive control (Reference Example) and used as a test solution. The test was conducted from May to October. First, bent grass (variety: Pencross) was divided into 1 m×2 m areas, and each test solution was sprayed once a month (a total of 6 times) in a volume of 100 mL/m$^3$. An area without spraying of the test solution was used as a control. The lawn was trimmed approximately once every two weeks. The lawn was pulled up from each test area using a small hole cutter in November, and sand was washed off, followed by root length measurement. Also, the root was cut out and dried at 80° C. for 24 hours, followed by the measurement of its weight (root weight). The results are shown in Table 9 below.

TABLE 9

| | Active ingredient Shikonix Liquid (BG) | Root length (cm) | Root weight (g) |
|---|---|---|---|
| Control | — | 10.8 | 0.035 |
| Example 40 | 200-fold dilution | 16.3 | 0.153 |
| Example 41 | 1000-fold dilution | 15.0 | 0.072 |
| Example 42 | 5000-fold dilution | 12.5 | 0.098 |
| Reference Example 3 | (ThermoZyme) | 11.8 | 0.060 |

As shown in Table 9, the induction of root elongation was confirmed in each example using the *Lithospermi radix* extract, as compared with the control. The *Lithospermi radix* extract was shown to have the heat-mitigating effect on lawn.

Test Example 10: Poor Growth Suppression Test of Spray-Type *Chrysanthemum* Using Naphthoquinone Compound A poor growth-suppressing effect was tested using spray-type *chrysanthemum* as a flowering plant and a *Lithospermi radix* extract containing shikonin compounds as a naphthoquinone compound. The *Lithospermi radix* extract used was Shikonix Liquid (BG) (manufactured by Ichimaru Pharcos Co., Ltd.). An aqueous solution of the Shikonix Liquid (BG) diluted 1000-fold with water was used as a test solution of example. The test was conducted from July to October in a greenhouse (settled planting was performed in July). First, 16 plants/area of spray-type *chrysanthemum* (variety: Spray Aichi Natsu 1 Go) was sectioned in duplicate, and the test solution was sprayed twice a month in a volume of 3 mL/plant. An area without spraying of the test solution was used as a control. At the time of flowering in October, the plant lengths and total cut flower weights were measured. Table 10 shows an average plant length and total cut flower weight.

TABLE 10

| | Active ingredient Shikonix Liquid (BG) | Plant length (cm) | Total weight of cut flower (g) |
|---|---|---|---|
| Control | — | 101.2 | 64.8 |
| Example 43 | 1000-fold dilution | 103.8 | 66.8 |

As shown in Table 10, an increased plant length and total cut flower weight were confirmed in the example using the *Lithospermi radix* extract, as compared with the control. The *Lithospermi radix* extract was shown to have an effect of suppressing the poor growth of spray-type *chrysanthemum*.

Test Example 11: Poor Growth Suppression Test of Rose Using Naphthoquinone Compound A poor growth-suppressing effect was tested using rose as a flowering plant and a *Lithospermi radix* extract containing shikonin compounds as a naphthoquinone compound. The *Lithospermi radix* extract used was Shikonix Liquid (BG) (manufactured by Ichimaru Pharcos Co., Ltd.). An aqueous solution of the Shikonix Liquid (BG) diluted 1000-fold with water was used as a test solution of example. The test was conducted from June to October in a greenhouse. First, 24 plants/area of rose (variety: Samurai 08) was sectioned, and the test solution was sprayed twice a month in a volume of 20 mL/plant. An area without spraying of the test solution was used as a control. The plants were cut out at the time of flowering in August, followed by the measurement of cut flower lengths (cm). Table 11 shows an average cut flower length.

TABLE 11

| | Active ingredient Shikonix Liquid (BG) | Cut flower length (cm) |
|---|---|---|
| Control | — | 77.2 |
| Example 44 | 1000-fold dilution | 81.6 |

As shown in Table 11, an increased cut flower length was confirmed in the example using the *Lithospermi radix* extract, as compared with the control. The *Lithospermi radix* extract was shown to have an effect of suppressing the poor growth of rose.

Test Example 12: Drought Tolerance Improvement Test of Japanese Mustard Spinach Using Naphthoquinone Compound A drought tolerance-improving effect was tested using Japanese mustard spinach as a plant and a *Lithospermi radix* extract containing shikonin compounds as a naphthoquinone compound.

Two parts each involving 16 cells (4×4) were cut out of a 128-cell tray. Seedling soil was placed therein, and water was added. 3 seeds of Japanese mustard spinach were seeded per cell. The temperature was set at 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 1 mL/cell. The same volume of water was sprayed to the other cell tray and used as a control. After the spraying, cultivation was continued without the addition of water. 12 days after the spraying, water was added to the soil. 4 days after the water addition, the number of Japanese mustard spinach survivors was counted and divided by the initial number of growing plants to calculate a survival rate (%). The results are shown in Table 12 below.

TABLE 12

| | Survival rate (%) |
|---|---|
| Control | 26 |
| Example 45 | 74 |

As shown in Table 12, a higher survival rate was confirmed in the example using the *Lithospermi radix* extract, as compared with the control. The *Lithospermi radix* extract was shown to have a drought tolerance-improving effect on Japanese mustard spinach.

Test Example 13: Drought Tolerance Improvement Test of Maize Using Naphthoquinone Compound (No. 1)

A drought tolerance-improving effect was tested using maize as a plant and a *Lithospermi radix* extract containing shikonin compounds as a naphthoquinone compound.

Two parts each involving 9 cells (3×3) were cut out of a 72-cell tray. Seedling soil was placed therein, and water was added. 4 seeds of maize were seeded per cell. The temperature was set to 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 2 mL/cell. The same volume of water was sprayed to the other cell tray and used as a control. After the spraying, cultivation was continued without the addition of water. 19 days after the spraying, water was added to the soil. 10 days after the water addition, the number of maize survivors was counted and divided by the initial number of growing plants to calculate a survival rate (%). The results are shown in Table 13 below.

TABLE 13

| | Survival rate (%) |
|---|---|
| Control | 48 |
| Example 46 | 83 |

As shown in Table 13, a higher survival rate was confirmed in the example using the *Lithospermi radix* extract, as compared with the control. The *Lithospermi radix* extract was shown to have a drought tolerance-improving effect on maize.

Test Example 14: Drought Tolerance Improvement Test of Maize Using Naphthoquinone Compound (No. 2)

A drought tolerance-improving effect was tested using maize as a plant and 5,8-dihydroxy-1,4-naphthoquinone, 2,3-dichloro-1,4-naphthoquinone, and 2,3-dichloro-5,8-dihydroxy-1,4-naphthoquinone as naphthoquinone compounds.

Four parts each involving 9 cells (3×3) were cut out of a 72-cell tray. Seedling soil was placed therein, and water was added. 4 seeds of maize were seeded per cell. The temperature was set to 20° C. using a plant growth chamber, followed by cultivation under 16-hour light and 8-hour dark conditions. After budding, each naphthoquinone compound dissolved in DMSO was diluted to 10 μM (final concentration) with deionized water to prepare a test solution of each example (final concentration of DMSO: 1.0% by volume). Each test solution was sprayed to leaf surface in one of the cell trays. The volume of the test solution sprayed was set to 2 mL/cell. The same volume of water was sprayed to the other cell tray and used as a control. After the spraying, cultivation was continued without the addition of water. 19 days after the spraying, water was added to the soil. 5 days after the water addition, the number of maize survivors was counted and divided by the initial number of growing plants to calculate a survival rate (%). The results are shown in Table 14 below.

TABLE 14

| | Active ingredient | Survival rate (%) |
|---|---|---|
| Control | — | 46 |
| Example 47 | 5,8-Dihydroxy-1,4-naphthoquinone | 92 |
| Example 48 | 2,3-Dichloro-1,4-naphthoquinone | 53 |
| Example 49 | 2,3-Dichloro-5,8-dihydroxy-1,4-naphthoquinone | 88 |

As shown in Table 14, a higher survival rate was confirmed in the example using the naphthoquinone compound, as compared with the control. The naphthoquinone compounds were shown to have a drought tolerance-improving effect on maize.

Test Example 15: Drought Tolerance Improvement Test of Alfalfa Using Naphthoquinone Compound A drought tolerance-improving effect was tested using alfalfa as a plant and a *Lithospermi radix* extract containing shikonin compounds as a naphthoquinone compound.

Two parts each involving 16 cells (4×4) were cut out of a 128-cell tray. Seedling soil was placed therein, and water was added. 4 seeds of alfalfa were seeded per cell. The temperature was set to 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 1 mL/cell. The same volume of water was sprayed to the other cell tray and used as a control. After the spraying, cultivation was continued without the addition of water. 9 days after the spraying, water was added to the soil. 14 days after the water addition, the number of alfalfa survivors was counted and divided by the initial number of growing plants to calculate a survival rate (%). The results are shown in Table 15 below.

TABLE 15

| | Survival rate (%) |
|---|---|
| Control | 33 |
| Example 50 | 83 |

As shown in Table 15, a higher survival rate was confirmed in the example using the *Lithospermi radix* extract, as compared with the control. The *Lithospermi radix* extract was shown to have a drought tolerance-improving effect on alfalfa.

Test Example 16: Salt Tolerance Improvement Test of Maize Using Naphthoquinone Compound (No. 1)

A salt tolerance-improving effect was tested using maize as a plant and a *Lithospermi radix* extract containing shikonin compounds as a naphthoquinone compound.

Two parts each involving 9 cells (3×3) were cut out of a 72-cell tray. Seedling soil was placed therein, and water was added. 4 seeds of maize were seeded per cell. The temperature was set to 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 2 mL/cell. The same volume of water was sprayed to the other cell tray and used as a control. Two days later, a 1.0% NaCl solution was prepared and absorbed from the underside of each cell tray. The NaCl solution treatment was performed five times every two days. The above-ground parts were cut off, and their fresh weights were measured. An average value (g/plant) was calculated. The results are shown in Table 16 below.

TABLE 16

| | Above-ground part weight (g/plant) |
|---|---|
| Control | 0.430 |
| Example 51 | 0.598 |

As shown in Table 16, an increased above-ground part weight was confirmed in the example using the *Lithospermi radix* extract, as compared with the control. The *Lithospermi radix* extract was shown to have a salt tolerance-improving effect on maize.

Test Example 17: Salt Tolerance Improvement Test of Maize Using Naphthoquinone Compound (No. 2)

A salt tolerance-improving effect was tested using maize as a plant and 5,8-dihydroxy-1,4-naphthoquinone, 2,3-dichloro-1,4-naphthoquinone, and 2,3-dichloro-5,8-dihydroxy-1,4-naphthoquinone as naphthoquinone compounds.

Four parts each involving 9 cells (3×3) were cut out of a 72-cell tray. Seedling soil was placed therein, and water was added. 4 seeds of maize were seeded per cell. The temperature was set to 20° C. using a plant growth chamber, followed by cultivation under 16-hour light and 8-hour dark conditions. After budding, each naphthoquinone compound dissolved in DMSO was diluted to 10 μM (final concentration) with deionized water to prepare a test solution of each example (final concentration of DMSO: 1.0% by volume). Each test solution was sprayed to leaf surface in one of the cell trays. The volume of the test solution sprayed was set to 2 mL/cell. The same volume of water was sprayed to the other cell tray and used as a control. Two days later, a 1.0% NaCl solution was prepared and absorbed from the underside of each cell tray. The NaCl solution treatment was performed five times every two days. The above-ground parts were cut off, and their fresh weights were measured. An average value (g/plant) was calculated. The results are shown in Table 17 below.

TABLE 17

|  | Active ingredient | Above-ground part weight (g/plant) |
| --- | --- | --- |
| Control | — | 0.581 |
| Example 52 | 5,8-Dihydroxy-1,4-naphthoquinone | 0.653 |
| Example 53 | 2,3-Dichloro-1,4-naphthoquinone | 0.726 |
| Example 54 | 2,3-Dichloro-5,8-dihydroxy-1,4-naphthoquinone | 0.677 |

As shown in Table 17, an increased above-ground part weight was confirmed in each example using the naphthoquinone compound, as compared with the control. The naphthoquinone compounds were shown to have a salt tolerance-improving effect on maize.

Test Example 18: Salt Tolerance Improvement Test of Rye Using Naphthoquinone Compound A salt tolerance-improving effect was tested using rye as a plant and a *Lithospermi radix* extract containing shikonin compounds as a naphthoquinone compound.

Two parts each involving 4 cells (2×2) were cut out of a 72-cell tray. Seedling soil was placed therein, and water was added. 5 seeds of rye were seeded per cell. The temperature was set to 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 2 mL/cell. The same volume of water was sprayed to the other cell tray and used as a control. Two days later, a 1.5% NaCl solution was prepared and absorbed from the underside of each cell tray. The NaCl solution treatment was performed eight times every two days. The above-ground parts were cut off, and their fresh weights were measured. An average value (g/plant) was calculated. The results are shown in Table 18 below.

TABLE 18

|  | Above-ground part weight (g/plant) |
| --- | --- |
| Control | 0.173 |
| Example 55 | 0.199 |

As shown in Table 18, an increased above-ground part weight was confirmed in the example using the *Lithospermi radix* extract, as compared with the control. The *Lithospermi radix* extract was shown to have a salt tolerance-improving effect on rye.

Test Example 19: Salt Tolerance Improvement Test of Alfalfa Using Naphthoquinone Compound A salt tolerance-improving effect was tested using alfalfa as a plant and a *Lithospermi radix* extract containing shikonin compounds as a naphthoquinone compound.

Two parts each involving 9 cells (3×3) were cut out of a 72-cell tray. Seedling soil was placed therein, and water was added. 12 seeds of alfalfa were seeded per cell. The temperature was set to 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 2 mL/cell. The same volume of water was sprayed to the other cell tray and used as a control. Two days later, a 0.7% NaCl solution was prepared and absorbed from the underside of each cell tray. The NaCl solution treatment was performed three times every two days. The above-ground parts were cut off, and their fresh weights were measured. An average value (mg/plant) was calculated. The results are shown in Table 19 below.

TABLE 19

|  | Above-ground part weight (mg/plant) |
| --- | --- |
| Control | 56.2 |
| Example 56 | 60.5 |

As shown in Table 19, an increased above-ground part weight was confirmed in the example using the *Lithospermi radix* extract, as compared with the control. The *Lithospermi radix* extract was shown to have a salt tolerance-improving effect on alfalfa.

Test Example 20: Salt Tolerance Improvement Test of Daikon Radish Using Naphthoquinone Compound A salt tolerance-improving effect was tested using daikon radish as a plant and a *Lithospermi radix* extract containing shikonin compounds as a naphthoquinone compound.

Two parts each involving 4 cells (2×2) were cut out of a 72-cell tray. Seedling soil was placed therein, and water was added. 8 seeds of daikon radish were seeded per cell. The temperature was set to 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 2 mL/cell. The same volume of water was sprayed to the other cell tray and used as a control. Two days later, a 1.0% NaCl solution was prepared and absorbed from the underside of each cell tray. The NaCl solution treatment was performed twice every two days. The above-ground parts were cut off, and their fresh weights were measured. An average value (g/plant) was calculated. The results are shown in Table 20 below.

TABLE 20

|  | Above-ground part weight (g/plant) |
| --- | --- |
| Control | 0.385 |
| Example 57 | 0.428 |

As shown in Table 20, an increased above-ground part weight was confirmed in the example using the *Lithospermi radix* extract, as compared with the control. The *Lithospermi radix* extract was shown to have a salt tolerance-improving effect on daikon radish.

Test Example 21: Salt Tolerance Improvement Test of Tomato Using Naphthoquinone Compound A salt tolerance-improving effect was tested using cherry tomato as a plant and a *Lithospermi radix* extract containing shikonin compounds as a naphthoquinone compound.

Two parts each involving 4 cells (2×2) were cut out of a 72-cell tray. Seedling soil was placed therein, and water was added. 8 seeds of daikon radish were seeded per cell. The temperature was set to 20° C. using a plant growth chamber, followed by cultivation under 16-hour light and 8-hour dark conditions. After budding, Shikonix Liquid (BG) (manufactured by Ichimaru Pharcos Co., Ltd.) was diluted 500-fold and sprayed as the *Lithospermi radix* extract to leaf surface in one of the cell trays. The volume of the Shikonix Liquid sprayed was set to 2 mL/cell. The same volume of water was sprayed to the other cell tray and used as a control. Two days later, a 1.0% NaCl solution was prepared and absorbed from the underside of each cell tray. The NaCl solution treatment was performed seven times every two days. The roots were cut out, washed, and dried at 80° C. for 24 hours, followed by the measurement of its weight. An average value (mg/plant) was calculated. The results are shown in Table 21 below.

TABLE 21

|  | Dry roots weight (mg/plant) |
| --- | --- |
| Control | 2.13 |
| Example 58 | 2.70 |

As shown in Table 21, an increased root weight was confirmed in the example using the *Lithospermi radix* extract, as compared with the control. The *Lithospermi radix* extract was shown to have a salt tolerance-improving effect on tomato.

Test Example 22: Sunburn Reduction Test of *Citrus unshiu* Using Naphthoquinone Compound A sunburn-reducing effect was tested using *Citrus unshiu* as a plant (fruit) and a *Lithospermi radix* extract containing shikonin compounds as a quinone compound.

Immediately after the end of the rainy season in Japan, Shikonix Liquid (BG) (manufactured by Ichimaru Pharcos Co., Ltd.) was diluted 200-fold and sprayed as the *Lithospermi radix* extract to 20 fruits of Gokuwase Unshu. The volume of the Shikonix Liquid sprayed was set such that the fruits were sufficiently wet. Unsprayed 20 fruits of Gokuwase Unshu were used as a control. At the beginning of September, the degree of sunburn of pericarps was evaluated. The evaluation was conducted on a scale of none (0), slight (1), moderate (2), and significant (3). In order to digitize an incidence, the products of the numbers of fruits and the numerical values within the parentheses were summed and divided by the total number of fruits. A lower incidence of sunburn is indicated by a lower number. The results are shown in Table 22 below.

TABLE 22

|  | Incidence |
| --- | --- |
| Control | 0.389 |
| Example 59 | 0.281 |

As shown in Table 22, the incidence of sunburn was confirmed to be lower in the example using the *Lithospermi radix* extract, as compared with the control. The *Lithospermi radix* extract was shown to have a sunburn occurrence-reducing effect on mandarin orange.

Test Example 23: Quality Deterioration Suppression Test of Pear Using Naphthoquinone Compound A quality deterioration-suppressing effect was tested using pear as a plant (fruit) and a *Lithospermi radix* extract containing shikonin compounds as a naphthoquinone compound.

The *Lithospermi radix* extract used was Shikonix Liquid (BG) (manufactured by Ichimaru Pharcos Co., Ltd.). An aqueous solution of the Shikonix Liquid (BG) diluted 200-fold with water was used as a test solution of example. The test was conducted from July to October in a farm field. One main branch each of two trees of pear (variety name: Nikkori) was used. The test solution was sprayed three times (date: July 15, July 28, and August 18) in a volume of 1 L/main branch. An area without the spraying of the test solution was used as a control. The fruits were harvested from mid-October through the end of October. The degree of physiological disorder (browning and cork) of the fruits was examined. The degree of disorder was evaluated on a four-point scale of 0 to 3, and the total number thereof was divided by the number of fruit individuals to determine a value. The results are shown in Table 23 below.

TABLE 23

|  | Active ingredient Shikonix Liquid (BG) | Physiological disorder of fruit | |
| --- | --- | --- | --- |
|  |  | Browning | Cork |
| Control | — | 1.3 | 1.0 |
| Example 60 | 200-fold dilution | 0.3 | 0.2 |

As shown in Table 23, the physiological disorder was confirmed to be distinctly suppressed in the example using the *Lithospermi radix* extract, as compared with the control.

The *Lithospermi radix* extract was shown to have a quality deterioration-suppressing effect on pear.

Test Example 24: Quality Deterioration Suppression Test of Tomato Using Naphthoquinone Compound A quality deterioration-suppressing effect was tested using tomato as a vegetable and a *Lithospermi radix* extract containing shikonin compounds as a naphthoquinone compound.

The *Lithospermi radix* extract used was Shikonix Liquid (BG) (manufactured by Ichimaru Pharcos Co., Ltd.). An aqueous solution of the Shikonix Liquid (BG) diluted 1000-fold with water was used as a test solution of example. The test was conducted from May to October in a farm field. 10 plants/area of tomato (variety name: Rinka 409) was used, and the test solution was sprayed in a sufficient volume on leaves and fruits once every two weeks from June 27 to August 29 (6 times in total). An area without the spraying of the test solution was used as a control. The plants were harvested and examined from August 14 to October 9. The rate (%) of physiological disorder (concentric fruit cracking) on tomato surface was determined. The tomato quality was evaluated on a scale of "excellent", "very good", and "others". The results are shown in Table 24 below.

TABLE 24

| | Active ingredient Shikonix Liquid (BG) | Rate of concentric-circular cracking | Grading | | |
|---|---|---|---|---|---|
| | | | Excellent | Very good | Others |
| Control | — | 34.2% | 8.1% | 18.2% | 73.7% |
| Example 61 | 1000-fold dilution | 17.6% | 13.5% | 23.1% | 63.4% |

As shown in Table 24, the physiological disorder was confirmed to be distinctly suppressed with a higher rate of the grade as "excellent" and "very good" in the example using the *Lithospermi radix* extract, as compared with the control. The *Lithospermi radix* extract was shown to have a quality deterioration-suppressing effect on tomato.

The invention claimed is:

1. A method for reducing rice quality loss, comprising applying a compound
   selected from the group consisting of a shikonin compound and an alkannin compound,
   wherein the shikonin compound is at least one compound selected from the group consisting of deoxyshikonin, acetylshikonin, isobutyrylshikonin, α-methyl-n-butyl-shikonin, isovalerylshikonin, β-hydroxyisovaleryl-shikonin, β,β-dimethylacrylshikonin, and β-acetoxyisovalerylshikonin, and
   wherein the alkannin compound is at least one compound selected from the group consisting of deoxyalkannin, acetylalkannin, isobutyrylalkannin, α-methyl-n-butyl-alkannin, isovalerylalkannin, β-hydroxyisovalerylal-kannin, β,β-dimethylacrylalkannin, and β-acetoxyisovalerylalkannin.

2. A method for inducing stress tolerance in a plant, comprising applying to the plant of interest a compound
   selected from the group consisting of a shikonin compound and an alkannin compound,
   wherein the shikonin compound is at least one compound selected from the group consisting of deoxyshikonin, acetylshikonin, isobutyrylshikonin, α-methyl-n-butyl-shikonin, isovalerylshikonin β-hydroxyisovaleryl-shikonin, β,β-dimethylacrylshikonin, and β-acetoxyisovalerylshikonin, and
   wherein the alkannin compound is at least one compound selected from the group consisting of deoxyalkannin, acetylalkannin, isobutyrylalkannin, α-methyl-n-butyl-alkannin, isovalerylalkannin, β-hydroxyisovalerylal-kannin, β,β-dimethylacrylalkannin, and β-acetoxyisovalerylalkannin.

3. The method according to claim 2, wherein the stress is at least one stress selected from the group consisting of temperature stress, osmotic stress, pathological stress, damage stress, atmospheric stress, pH stress, light stress, and chemical stress.

4. The method according to claim 3, wherein the stress is at least one stress selected from the group consisting of high-temperature stress, osmotic stress, and light stress.

5. The method according to claim 2, wherein the plant is at least one plant selected from the group consisting of a plant of the order Brassicales, a plant of the order Fabales, a plant of the order Asterales, a plant of the order Rosales, a plant of the order Solanales, a plant of the order Sapindales, and a plant of the order Poales.

6. The method according to claim 2, wherein the method is used for reducing rice quality loss, growing lawn by heat mitigation, suppressing the spindly growth of a seedling, suppressing the poor growth of a flowering plant, reducing the quality deterioration of a fruit tree, or reducing the quality deterioration of a vegetable.

\* \* \* \* \*